(12) United States Patent
Barjesteh

(10) Patent No.: US 6,647,761 B2
(45) Date of Patent: Nov. 18, 2003

(54) HAND HELD FLEXIBLE MOUNT LEAK DETECTOR

(75) Inventor: Michael Barjesteh, Denville, NJ (US)

(73) Assignee: Mastercool, Inc., Randolph, NJ (US)

( * ) Notice: Subject to any disclaimer, the term of this patent is extended or adjusted under 35 U.S.C. 154(b) by 0 days.

(21) Appl. No.: 10/174,729

(22) Filed: Jun. 19, 2002

(65) Prior Publication Data

US 2003/0010093 A1 Jan. 16, 2003

Related U.S. Application Data

(60) Provisional application No. 60/304,928, filed on Jul. 12, 2001.

(51) Int. Cl.$^7$ .......................... G01N 2/72; G01N 31/00; G01N 21/64; G01N 1/26
(52) U.S. Cl. .......................... 73/40; 73/40.7; 73/31.05
(58) Field of Search ...................... 73/40, 61.48, 31.05, 73/40.7

(56) References Cited

U.S. PATENT DOCUMENTS

| | | | | |
|---|---|---|---|---|
| 2,449,053 A | * | 9/1948 | Burns et al. ................... 73/40 |
| 2,727,997 A | * | 12/1955 | Schofield ..................... 250/218 |
| 3,427,862 A | | 2/1969 | Hubner ........................ 73/23.2 |
| 4,173,886 A | | 11/1979 | Archbold et al. ............ 73/23.2 |
| 4,262,522 A | | 4/1981 | Reich ........................... 73/23.2 |
| 5,149,453 A | | 9/1992 | Parekh ........................ 252/68 |
| 5,293,771 A | | 3/1994 | Ridenour ...................... 73/40 |
| 5,301,537 A | * | 4/1994 | Atkinson ...................... 73/40 |
| 5,351,532 A | * | 10/1994 | Hager .......................... 73/153 |
| 5,356,594 A | | 10/1994 | Neel et al. ................... 422/54 |
| 5,457,528 A | * | 10/1995 | Tobias ......................... 356/300 |
| 5,490,413 A | * | 2/1996 | Atkinson ...................... 73/40 |
| 5,522,253 A | | 6/1996 | Knight ......................... 73/23.34 |
| 5,561,240 A | | 10/1996 | Ochiai et al. ................. 73/40.7 |
| 5,788,364 A | * | 8/1998 | Cooper et al. ............... 362/293 |
| 5,801,297 A | | 9/1998 | Mifsud et al. ............... 73/23.34 |
| 5,975,712 A | * | 11/1999 | Shiao .......................... 362/120 |
| 6,018,983 A | * | 2/2000 | Jones et al. .................. 73/23.2 |
| 6,053,030 A | | 4/2000 | Whynall et al. .............. 73/23.2 |
| 6,085,576 A | | 7/2000 | Sunshine et al. ........... 73/29.01 |
| 6,116,082 A | * | 9/2000 | Pride ........................ 73/40.5 R |
| 6,134,952 A | * | 10/2000 | Garver et al. ............... 73/61.71 |
| 6,200,134 B1 | * | 3/2001 | Kovac et al. ................. 433/29 |
| 6,491,408 B1 | * | 12/2002 | Cooper et al. ............... 362/184 |

OTHER PUBLICATIONS

Owner's Manual, AC850 Leak–Seeker.
Paul Weissler, MACS Service Reports, Special Update on Refrigerant Leak Detection, Jun., 2001, pp. 5–7 & 9–12.
WWW.FIFTY–FOUR.NO., Product Specifications for the 54.7 PAS Gas Sensor Modules (Draft), Jan. 27, 2000, pp. 1–11.
Stonegate Instruments Ltd., VS1000—Refrigerant Gas Sensor, 1 page.
Nichia America, Ultraviolet 370—390 nm Gallium Nitride, pp. 1–5.

* cited by examiner

*Primary Examiner*—Hezron Williams
*Assistant Examiner*—David J. Wiggins
(74) *Attorney, Agent, or Firm*—Mathews, Collins, Shepard & McKay

(57) ABSTRACT

A hand held refrigeration fluid leak detector for observing and detecting optical fluorescence resulting from optical excitation of the leaking refrigeration fluid provides single hand operation for a user while holding the main body of the detector with either one of two hands. The flexible stalk is coupled to the main body and to a head containing an LED light source which provides spectral emissions in the UV to blue range. In one embodiment, the hand held detector includes a gas detector.

14 Claims, 4 Drawing Sheets

HAND HELD FLEXIBLE MOUNT LEAK DETECTOR

CROSS REFERENCES TO RELATED APPLICATIONS

This application claims the benefit under 35 U.S.C. 119(e) of U.S. Provisional Application Serial No. 60/304,928, entitled Flexible Mount Leak Detection, filed on Jul. 12, 2001.

FIELD OF INVENTION

The present invention relates generally to a hand held tool for detecting leaks in pressurized air conditioning systems.

BACKGROUND OF THE INVENTION

A frequent problem with pressurized refrigeration systems is a small refrigerant leak at a fitting, joint, or in a hose. One method for detecting the leak from the pressurized refrigeration system is to inject a fluorescent dye into the pressurized refrigeration system and then to use a UV/Blue (Ultra-Violet/Blue) light source to detect the dye and thus locate the leak site. Alternatively, the leak may be detected by using a halogen gas sensor (detector). Typically, a refrigerant leak is very difficult to detect and pinpoint when using only gas detector or when using only UV/Blue light. The nature of the refrigerant leak determines which method works best, thus the best method to use may not be known in advance. Traditional UV/Blue light sources are large and get hot under normal operating conditions. In a confined environment, such as an automobile, the use of a traditional UV/Blue light source can be a hazard in the confined quarters as well as difficult or impossible to use for fittings and hoses that are not easily accessible.

Therefore there is a need for a hand held leak detector which can be safely and easily operated in the confined quarters.

SUMMARY OF THE INVENTION

The present invention is a hand held refrigeration leak detector which provides single hand operation for a user while holding the main body of the detector. The flexible stalk is coupled to the main body and to a head containing an LED light source which provides spectral emissions in the UV to blue range.

BRIEF DESCRIPTION OF THE DRAWINGS

A more complete understanding of the present invention may be obtained from consideration of the following description in conjunction with the drawings in which.

DETAILED DESCRIPTION OF ILLUSTRATIVE EMBODIMENTS

Figure 1:
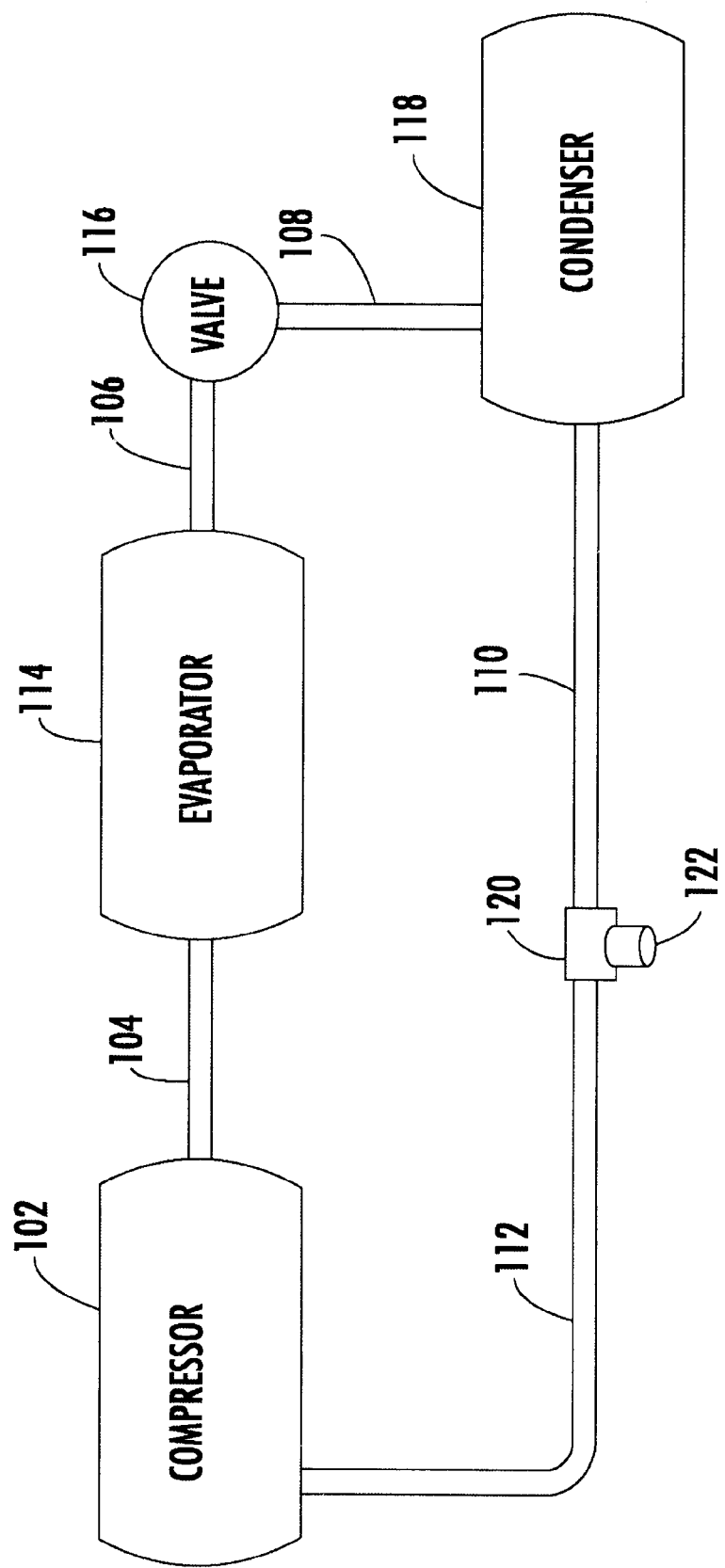
FIG. 1 is a schematic view of a pressurized air conditioning refrigeration system, which utilizes the present invention.

The present invention is a hand held flexible mount leak detector for detecting leaks in pressurized air conditioning systems. Referring to FIG. 1 there is shown a simplified schematic view of a typical pressurized air conditioning refrigeration system, which utilizes the present invention, hand held flexible mount leak detector. Essentially, the pressurized air conditioning refrigeration system comprises a compressor 102, connective conduits 104, 106, 108, 110 and 112, an evaporator 114, an expansion valve 116, a condenser 118, and an access fitting 120, which form a closed loop. The compressor 102 is coupled by a first connective conduit 104 to the evaporator 114. A second connective conduit 106 couples the evaporator 114 to the expansion valve 116. A third connective conduit 108 couples the expansion valve 116 to the condenser 118. A fourth connective conduit 110 couples the condenser 118 to the access fitting 120. A fifth connective conduit 112 couples the access fitting 120 to the compressor, thus completing the closed loop. The access fitting 120 has a valve 122 with removable core (not shown). The access fitting is used to fill, purge and drain the closed system with refrigerant, as well as to add lubricants and dyes to the system.

The present invention, hand held flexible mount leak detector, addresses the need by the refrigeration industry for a small leak detector with remote sensing that can be operated and positioned with one hand and combines a halogen gas sensor and UV/Blue light source to illuminate fluorescence dye. One method for detecting the refrigerant leak from the pressurized refrigeration system is to inject a fluorescent dye into the pressurized refrigeration system and then to use a UV/Blue light source to detect the dye and thus locate the leak site. Alternatively, the leak may be detected by using a halogen gas sensor (detector). The refrigerant leak is very difficult to detect and pinpoint when using only gas detector or when using only UV/Blue light. The nature of the refrigerant leak determines which method works best, thus the best method to use may not be known in advance. Traditional UV/Blue light sources are large and get hot under normal operating conditions. In a confined environment, such as an automobile, the use of a traditional UV/Blue light source can be a hazard in the confined quarters.

Due to space limitations it has not been possible to locate a gas sensor and traditional UV/Blue light on a small common probe. Furthermore, a traditional UV/Blue source is large and get hot under normal operating conditions, which is poses a fire hazard in confined quarters, such as that of an automobile engine compartment or the passenger compartment area behind the dash board. The ability to use a small hand held flexible mount probe enables the rapid pinpointing of the refrigerant leak. By utilizing a high power UV/Blue light source, such as a Light Emitting Diode (LED) having a typical emitting source from UV to blue, a small hand held flexible mount probe can be constructed and used to access leak sites with limited access (such as an automobile engine compartments and the passenger compartment area behind the dash board). The emission of the UV/Blue LED is selected to correspond to a particular fluorescent dye's properties. A combination of a blue and a UV LED or a single high energy blue LED or UV LED can be utilized. By utilizing a combination of LEDs having various emission spectra, the hand held flexible mount leak detector will operate with a variety of fluorescent dyes. The fluorescent dye is inserted into the refrigeration system and will mark the area of the leak when it is carried out of the leak with a small amount of lubricant, provided the leak is of sufficient size.

By combining a halogen gas sensor and UV/Blue light source in the present invention hand held flexible mount leak detector, a refrigerant leak is more rapidly detected and pin pointed (located) that by using a halogen gas sensor or UV/Blue light source alone than by the use of either detector alone. This combination is only possible because of the efficient (low heat) illumination and small size provided by the UV/Blue LED light source. A variety of halogen gas sensors may be used, such as the photoacoustic gas sensing silicon microsystem has been patented and developed by 54.7, as well as numerous refrigerant gas leak detectors that are commercially available from a variety of manufacturers including Yokogawa and Stonegate Instruments. The refrigerant will mix with air and may be detected by a halogen gas detector, however if the leak is very small, and air there is significant air flow near the leak, typically no signal (detection) by the gas leak detector will be given. The advantage of combining the gas leak detector with the UV/Blue light source is that of combining general air detection and that of highly localized dye marks. Thus by first localizing the leak area with the halogen gas detector, the area to UV/Blue light source can be uses to search the immediate area to pinpoint the leak (which may not be directly visible).

Figure 2:
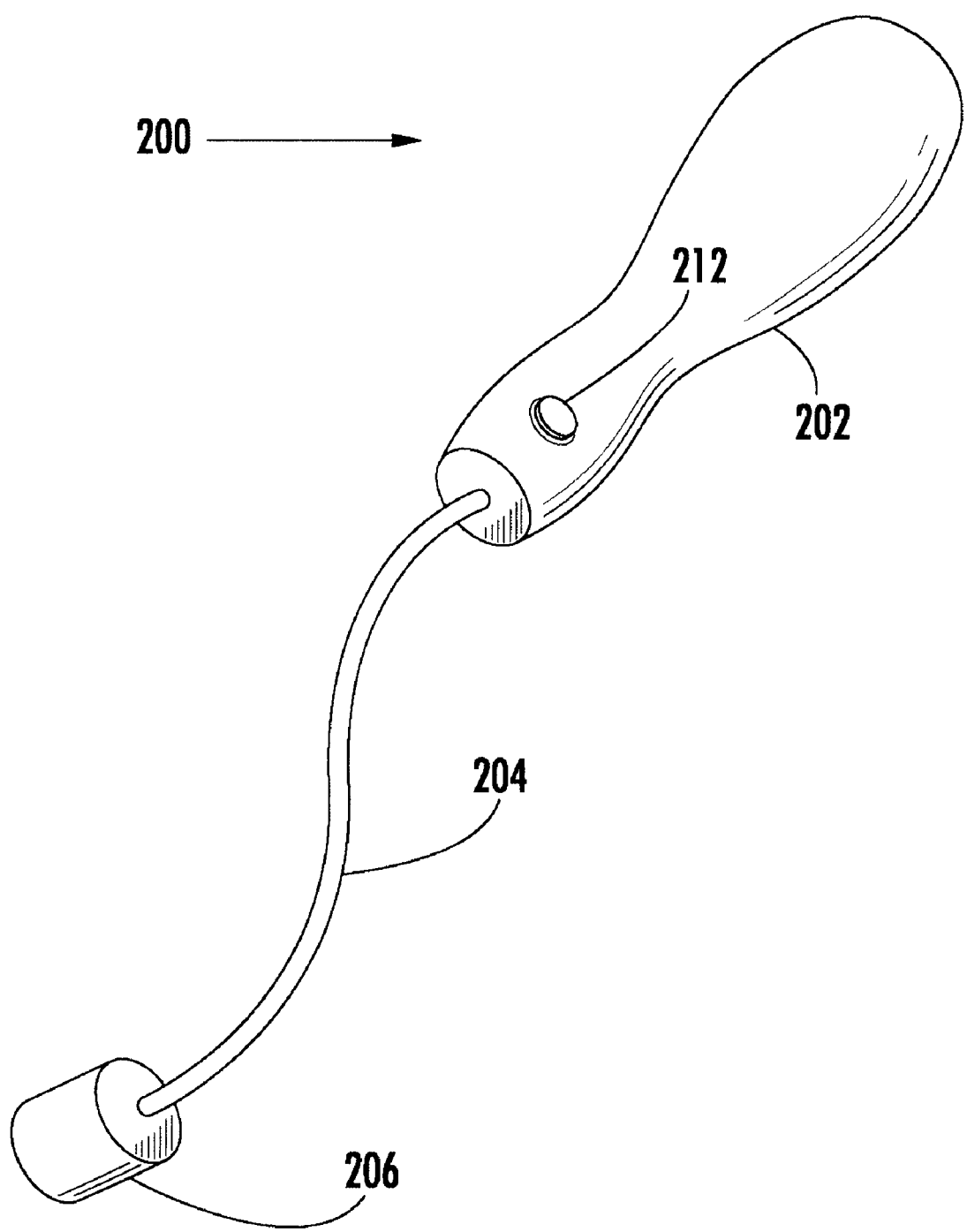
FIG. 2 is a high level stylized drawing of the hand held flexible mount leak detector.
Figure 3A:
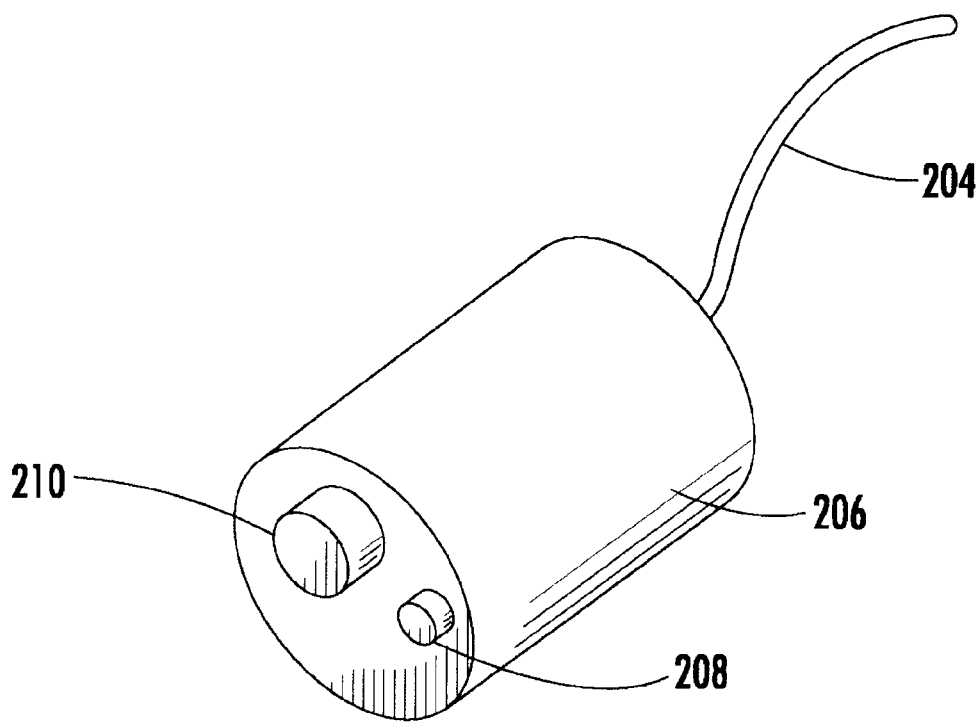
FIGS. 3a, 3b, 3c and 3d are exemplary sensor probe head embodiments.
Figure 3B:
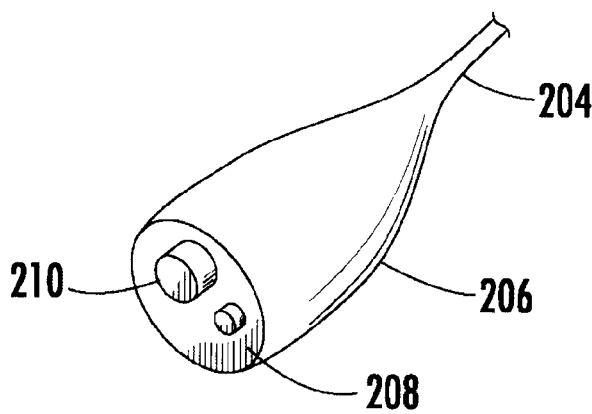
Figure 3C:
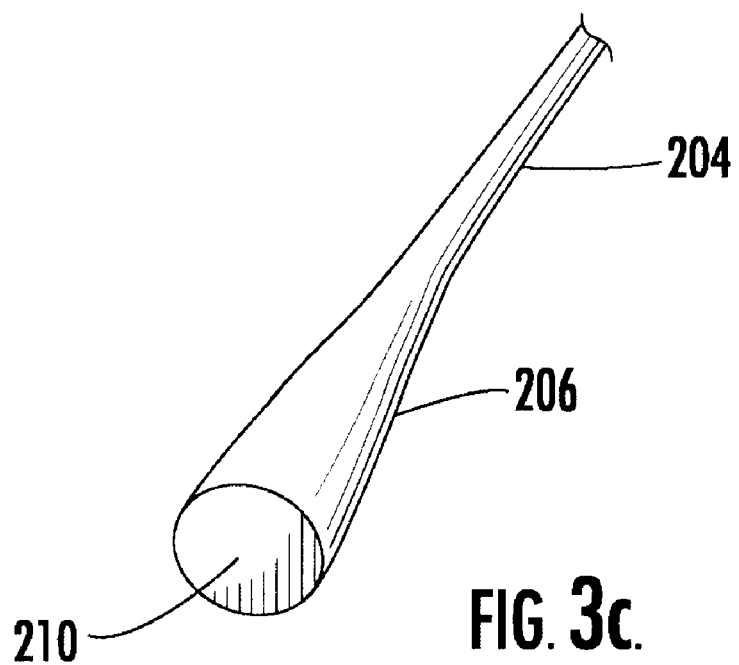
Figure 3D:
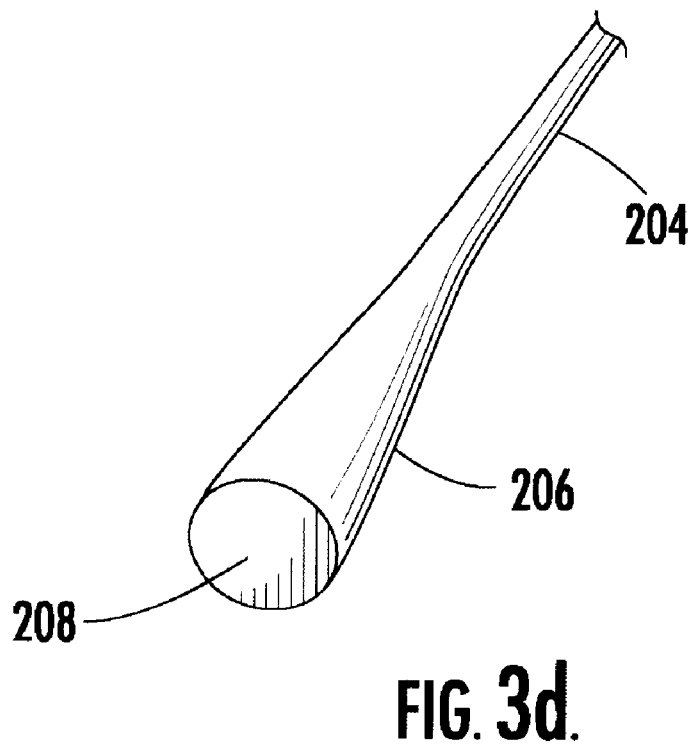

The present invention, hand held flexible mount leak detector, addresses a particular need for detecting refrigerant leaks from a system that has environmental access restrictions and requires specific detection methods. Referring to FIG. 2 in conjunction with FIGS. 3a, 3b, 3c and 3d, there is shown one embodiment of the present invention, hand held flexible mount leak detector 200. The flexible mount leak detector consists of a main body 202, flexible stalk 204 and a sensor probe head 206. In one embodiment of the present invention, the sensor probe head 206 contains a UV/Blue LED light source 208 and a halogen sensor access port or halogen sensor 210. The main body 202 provides for hand held portability and provides the electrical power for the UV/Blue LED source 208 and the interface. The flexible stalk 204 provides fixed multiple positions of sensor head and a conduit for electrical power required by remote mount sensors. The flexible stalk 204 also provides pneumatic conveyance required by sensor probe head 206. Sensor probe head 206 is connected to main body 202 by the flexible stalk 204. The shape of the main body 202 is adapted to be easily held and allow the device to be simply operated with a single hand, enabling the UV/Blue LED light source 208 to be quickly activated and deactivated and the halogen gas detector to be controlled. In yet a further embodiment a switch 212, such as a momentary action switch, is mounted in the main body 202, enabling easy single hand operation which provides eye protection from UV emissions, my making the UV emissions available on demand, when maneuvering in the confined quarters that the operator typically must work in.

The flexible stalk 204 can be made from a variety of materials known to those skilled in the art, including but not limited to metal, plastic, rubberized materials, as well as flexible tubing having an inner bendable member (wire, etc.) or an integral bendable member within the tubing wall. In a further embodiment, the flexible stalk 204, sensor probe head 206 and main body 202 are made from or covered in a non-conducting material, such as plastic, rubberized materials, etc. providing safety by eliminating the potential danger of causing an electrical short circuit, which can easily happen in an environment such as an automobile engine compartment or the passenger compartment area behind the dash board. The shape of the flexible stalk 204 can be changed easily, including during single hand use by holding the main body 202 in the hand and pressing the flexible stalk 204 against the refrigeration system fittings, tubing, and other structures as well. Thus providing a rapid system for detecting a refrigerant leak in confined quarters, where access by a probe as well as for the operated of the probe is restricted.

The UV/Blue LED light source 208 (which as previously described may be multiple LEDs) is mounted in sensor probe head 206 with power supply mounted in the body 202 or alternatively with the power supply mounted in the sensor probe head 206. The gas detector 210 maybe a sensing device mounted in sensor probe head 206 with electronic circuitry mounted in sensor probe head 206 or main body 202.

The UV/Blue LED source 208 requires very little power enabling the use of a small and portable battery device. A separate lens to pass UV/Blue light is not required as the LED typically generates energy in the UV/Blue region saving cost, weight, and cost.

General advantages of the combination leak detector include a flexible stalk having a UV/Blue LED source 208 and gas detector sensor 210 and its single hand operation. The UV/Blue LED source 208 generates almost no heat in contrast to traditional most UV/Blue light sources that generate large amounts of heat requiring turning light off after approximately 3 minutes of use and cooling off for a period of time before using again. The UV/Blue LED source 208 is small enabling access to areas that maybe a problem with traditional UV/Blue sources. The narrow frequency range of emissions by the UV/Blue LED light source 208 does not require filters to excite fluorescent dye.

Halogen leaks can respond to dye leak checks or gas detection leak checks. Some leaks only respond to one or the other. Having both dye and gas detection in the same probe provides an advantage in detecting leaks and pin pointing their location.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed:

1. A hand held refrigeration fluid leak detector comprising:
   a main body having at least one surface suitable for holding;
   a head having at least one LED light source with a spectral emission in the UV to blue range mounted therein; and
   an elongated flexible stalk coupled at a first end to the main body and at a second end to the LED-containing head so as to permit the head to assume a variety of angular positions relative to the main body;
   the holdable surface of said main body being electrically isolated from the outer-surfaces of said head and stalk, wherein at least one of the head, the flexible stalk, and the main body has an electrically non-conducting outer-surface.

2. The hand held refrigeration fluid leak detector as recited in claim 1 wherein the head has an electrically non-conducting outer-surface.

3. The hand held refrigeration fluid leak detector as recited in claim 1 wherein the flexible stalk has an electrically non-conducting outer-surface.

4. The hand held refrigeration fluid leak detector as recited in claim 1 wherein the main body has an electrically non-conductive outer-surface.

5. The hand held refrigeration fluid leak detector as recited in claim 1 wherein the main body further comprises switching means operable to electrically activate the LED light source.

6. The hand held refrigeration fluid leak detector as recited in claim 5 wherein the switch for activating the LED light source is adapted to be actuated while holding the main body with a single hand.

7. The hand held refrigeration fluid leak detector as recited in claim 1 wherein the main body contains a battery power supply.

8. A hand held refrigeration fluid leak detector comprising:
- a main body having at least one surface suitable for holding;
- a head having at least one LED light source with a spectral emission in the UV to blue range mounted therein;
- gas detection means in the head or communicating with the head via a pneumatic passageway; and
- an elongated flexible stalk coupled at a first end to the main body and at a second end to the head so as to permit the head to assume a variety of angular positions relative to the main body;
- the holdable surface of said main body being electrically isolated from the outer-surfaces of said head and stalk, wherein at least one of the head, the flexible stalk, and the main body has an electrically non-conducting outer-surface.

9. The hand held refrigeration fluid leak detector as recited in claim 8 wherein the gas detection means further comprises a gas sensor access port in the head, the gas sensor access port pneumatically coupled to a gas sensor located in the main body via a pneumatic passageway.

10. The hand held refrigeration fluid leak detector as recited in claim 8 wherein the gas detection means is an integrated gas sensor mounted in the head.

11. The hand held refrigeration fluid leak detector as recited in claim 8 wherein the gas detector is a halogen gas detector.

12. The hand held refrigeration fluid leak detector as recited in claim 8 wherein the main body further comprises switching means operable to electrically activate the gas detector.

13. The hand held refrigeration fluid leak detector as recited in claim 12 wherein the switch for activating the gas detector is adapted to be actuated while holding the main body of the detector with a single hand.

14. The hand held refrigeration fluid leak detector as recited in claim 8 wherein the main body contains a battery power supply.

* * * * *